United States Patent [19]

Fleisch et al.

[11] 4,330,974

[45] May 25, 1982

[54] EASY-TO-ASSEMBLE STRUCTURE

[76] Inventors: William F. Fleisch, 126 Campbell Ave., Williston Park, N.Y. 11596; Walter Pousche, 58-05 Metropolitan Ave., Brooklyn, N.Y. 11237

[21] Appl. No.: 828,863

[22] Filed: Aug. 29, 1977

Related U.S. Application Data

[63] Continuation-in-part of Ser. No. 520,441, Nov. 1, 1974, Pat. No. 4,045,090, which is a continuation-in-part of Ser. No. 264,207, Jun. 19, 1972, Pat. No. 3,845,988.

[51] Int. Cl.³ .............................................. E04B 2/74
[52] U.S. Cl. .................................. 52/486; 248/225.2; 297/440
[58] Field of Search .................. 52/486, 483; 297/440; 211/97, 186; 248/225.2, 224.4, 73; 160/369; 182/178

[56] References Cited

U.S. PATENT DOCUMENTS

| | | | |
|---|---|---|---|
| 655,991 | 8/1900 | Ralph | 160/369 |
| 1,087,551 | 2/1914 | Reed | 160/369 |
| 2,244,136 | 6/1941 | Zercher | 160/369 X |
| 2,759,746 | 8/1956 | Sitterly | 160/369 X |
| 3,608,266 | 9/1971 | Satkin et al. | 52/486 X |
| 3,722,163 | 3/1973 | Satkin et al. | 52/486 X |
| 4,002,283 | 1/1977 | Holloway, Jr. | 312/257.5 K |

FOREIGN PATENT DOCUMENTS 10222  5/1906  United Kingdom .................. 52/486

*Primary Examiner*—James T. McCall
*Attorney, Agent, or Firm*—Chou H. Li

[57] ABSTRACT

The house or structure comprises a tubular metal supporting frame; and a first and a second structural members carried on selected portions thereof. The second member is slidable along the frame to form a gravity-controlled locking engagement therewith and also to allow the first member to be placed in position thereby instantly completing the assembly of the structure.

10 Claims, 13 Drawing Figures

EASY-TO-ASSEMBLE STRUCTURE

CROSS-REFERENCE TO RELATED APPLICATION

This is a continuation-in-part of our pending application Ser. No. 520,441, filed Nov. 1, 1974, now U.S. Pat. No. 4,045,090, which itself is a continuation-in-part of our pending application Ser. No. 264,207, filed June 19, 1972, now U.S. Pat. No. 3,845,988. We hereby incorporate both these applications by reference.

BACKGROUND OF THE INVENTION

The invention relates to easy-to-assembly structures (including houses), and more particularly to easy-to-assemble structures having gravity-controlled, locking engagements between their components.

The invention has wide educational, household, commercial, industrial, ... uses. While not limited thereto, it is herein described mostly in connection with a home, a seat or bench, a (telephone or voting) booth, and a carrel-table assembly for the library study.

The ordinary library carrel-table assembly is very complicated in design but weak in structure. Usually the assembly is made of several pieces of ¾" plywood assembled together by means of angle irons, brackets, tension bolts, nuts, wood screws, and the like arranged in unsightly manners. The number of these fastening devices in amazingly large. Not infrequently, there are over 60 or 85 screws or bolts to be meticulously assembled into the structure. The assembling operation typically takes two skilled workers several hours just to understand the instructions alone.

The steel bolts and screws are by no means the best fastening devices for the purpose. The wood between the screw threads are easily stripped. The hole for a screw is often enlarged, thereby loosening the screw grip and hastening the stripping process. This condition soon renders the screw useless as an effective fastening device. Load on the structure is then shifted, with increasing intensity, to the other screws or bolts. Again and again, the loosening and stripping processes are reinitiated with increasing rapidity until complete catastrophic failure of the carrel occurs.

Many of the screws are often located in hard-to-reach places. They are often designed to intersect the plywood surfaces at acute angles far from 90°. Such designs invariably result in weak structural joints. In addition, the many angle irons, screws, bolts, and nuts used on the ordinary carrel often protrude out of the plywood. They are thus unsightly and unsafe. The weight of the numerous fastening devices is often another undesirable factor to consider.

In summary, the conventional carrel is complicated in design, weak in structure, heavy in weight and, furthermore, unsightly to see, unsafe to use, time consuming to assemble, and costly to install.

SUMMARY OF THE INVENTION

Therefore, to overcome the above and other difficulties, the general object of this invention is to provide improved structures readily assembled from their components.

Another object is to provide inexpensive, easy-to-assemble structures including houses.

Another object is to provide easy-to-assemble structures having gravity-controlled, locking engagements between the components.

A further object is to provide light but strong, easy-to-assemble structures which are simple in design and pleasing in appearance.

Another object is to provide interchangeable and intermixable structural components to greatly enhance design flexibility.

Other objects and advantages, and a more complete understanding of the invention will become apparent from the following descriptions and claims, taken in conjunction with the accompanying drawing.

DESCRIPTION OF THE DRAWING

For the purpose of illustrating the invention, there is shown in the drawing the forms which are presently preferred. It is understood, however, that this invention is not necessarily limited to the precise arrangements and instrumentalities here shown.

DESCRIPTION OF THE PREFERRED EMBODIMENTS

Figure 1:
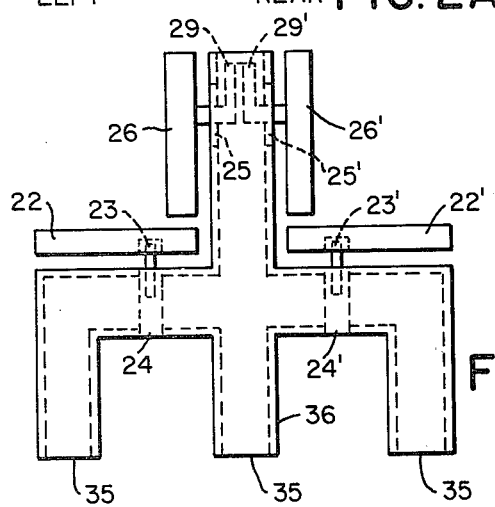
FIG. 1 shows a side view of a simple bench, or a back-to-back double bench according to the invention.

FIG. 1 shows a side view of an easy-to-assemble bench. A rigid framed supporting device 21 is first placed with its feet 35 on the ground but its vertical column or columns 36 (about 50" high) in upright positions. One or more of the feet 35 may have height-adjusting mechanisms, such as screws with bottom pads, to insure leveling of the bench. Preferably, the frame is made of rectangular or square metal tubes, such as 1¼"×1¼", 14 gauge cold-rolled, tubular steel. A horizontal seat member 22 made of plywood ¾" thick by 18" wide is to be placed on the top surface of the seating portion of the frame (at about 17" from the ground). This horizontal member 22 is prevented from moving horizontally, particularly away from the vertical columns 36, by a dowel or dowels 23, about ⅜" in diameter by ¾" long built into the underside of the horizontal member 22. The dowels 23 are adapted to engage matching holes 24 on the supporting device 21. Each of the vertical columns 36 has at least one vertical, narrow slot 25 made by punching, slitting, or other means (see FIG. 2). A vertical member 26 forming the back support of the bench and also made of ¾" plywood is next mounted in a vertical position against the column.

Figure 2A:
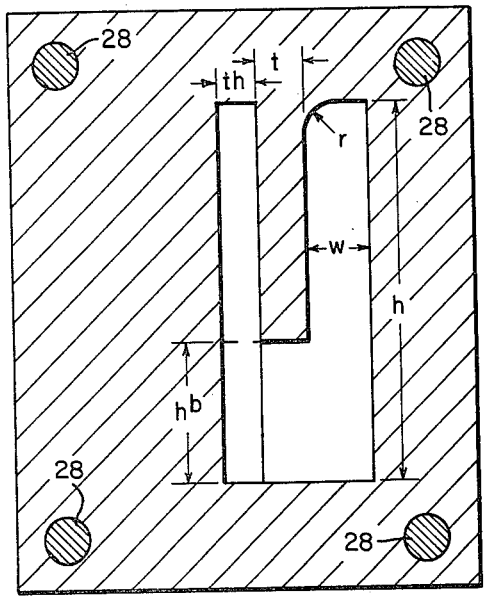
FIGS. 2 and 2A show details of the counter-gravity locks used in the bench of FIG. 1.
Figure 2:
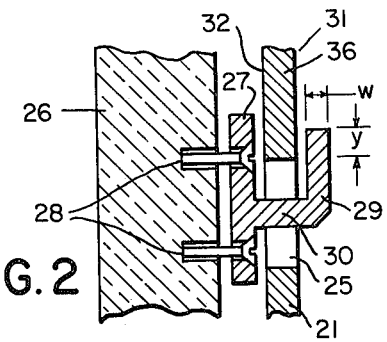

As shown in the enlarged view of FIG. 2, the vertical member 26 has one or more metal plates 27 (e.g., 12 gauge cold-rolled steel) secured to its back side by glueing, or factory-inserted screws 28. Hooks 29 are partially cut or stamped out of the metal plates 27, and bent 90° at their bases 30, which are still connected to the metal plates 27. The 90° bending provides, for a given metal plate and tubular column, much greater steel-to-steel bearing surfaces and better joint strength than otherwise possible.

The hooks 29 in FIGS. 1 and 2 have open ends pointing upward, and are positioned to be all inserted simultaneously into the matching slots 25. Further, the hooks 29 and slots 25 form counter-gravity locking engagements to secure, against gravity, the vertical member 26 to the columns 36. By inserting the hooks 29 into the slots 25 and lifting the vertical member 26 relative to the frame 21, the rear part of the horizontal seat member 22 may be inserted directly below the lower edge of the vertical member 26 and, simultaneously, properly dowelled with the dowels 23. The insertion of the horizontal or seat member 22 prevents the vertical member 26 from falling under gravity out of the locking engagement. These simple provedures take two men only a few minutes' time to complete the assembly of the sturdy bench structure.

It is to be particularly noted that the hooks 29 have generally vertical sides to match the inside wall 31 and outside wall 32 of the tubular vertical columns 36. Further, there are substantial contacting regions y (over $\frac{3}{8}"$ high) between the hooks 29 and tubular metal walls 31 and 32. This insures a strong locking engagement. The thickness $t_h$ of the hooks 29 is less than the width $t_s$ of the matching slots 25, preferably by only a few mils or less, so as to achieve high joint strength. The hooks 29 may even be thinner at their entrance edges 33, but thicker at their bases 30, than the width of the matching slots 25, so as to achieve interference fits. For this last application, the metal of the vertical columns 36 should preferably be strain-hardenable, such as iron, steel, or aluminum, in order to strain-harden and strengthen the metal around the slots 25 near the bases of the intruding hooks 29.

If required, the above bench can be extended to any length by lengthening the supporting device 21, the horizontal seat member 22, and the vertical member 26. Alternately, the seat and vertical members, 22 and 26, can each be made of several segments of plywood pieces six or eight feet in length. For a short bench, say less than two feet, only one dowel 23 and a single locking engagement from a pair of slot and hook is needed. In this case, the vertical member 26 is adequately secured to the frame 21 by this locking engagement and also by having its lower edge bearing on the horizontal seat member 22. This seat member 22, meanwhile, is held in position by the vertical member 26 and dowel 23.

In most cases, however, two or more dowels 23 and hook-slot pairs are needed. It may even be desirable, particularly with tall vertical members 26, to have the hook-slot pairs arranged in two or more horizontal rows. The details of this arrangement can be readily designed by any skilled persons in the art.

The framed supporting device 21 may be made of a single plastic or cement piece, with short pieces of metal tubes molded or cast in place to form the needed slots 25 at a given height level and specified horizontal distances apart. The same supporting device 21 can also be made of metal tubes jointed together by, e.g., welding or brazing. This same device can even be made of two or more parallel, similar and spaced apart tubular frames. Each frame has at least one slot for engagement by a hook 29 secured on the vertical member 26, and also has a hole 24 for engagement by a dowel 23 secured on the horizontal members 22. Upon the completion of these engagements, these frames 21, the vertical member 26, and the horizontal seat member 22 are all assembled together into a strong, unitary bench structure.

Notice that in assembling the above bench, there are no screws or bolts to be selected, positioned, aligned, turned, . . . There are certainly no protruded bolts, nuts, or angle irons. There are also no metal parts to be seen or to cause personal injury, at least on the critical front side. The outer surfaces of the vertical member 26 and horizontal member 22 are not damaged or changed in the slightest manner. Artistic designs or color patterns on these surfaces will therefore be uninterrupted by screw holes, nuts, bolts.

As shown on the right side of FIG. 1, a second seat or bench arranged back-to-back relative to the previous seat may also be assembled on the same but extended supporting device 21. Needed here are only an additional horizontal seat member 22' with its attached dowel 23' to fit into hole 24', and another vertical member 26' with its attached hook 29' to engage with its matching slot 25' in the same vertical columns 36.

Figure 3:
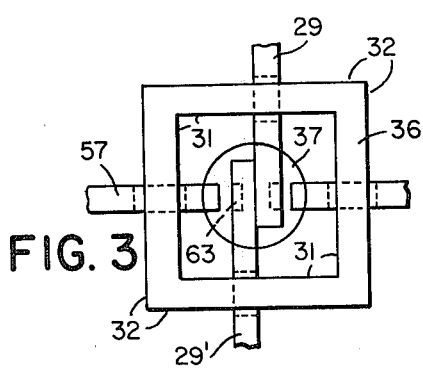
FIG. 3 is a top view of one of the tubular metal members, together with the metal hooks intruded from the sides into the tubular metal member and joined together by cement or other means.
Figure 4:
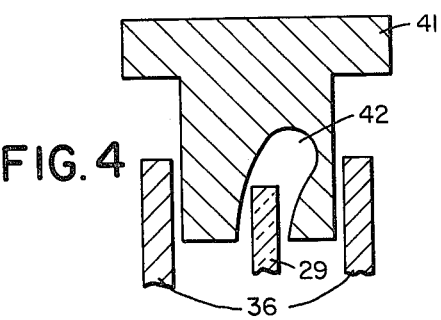
FIG. 4 shows a bending die used to bend or twist the hooks, so as to secure permanent locking engagement of the structural components.

The hooks 29 and 29' may extend from opposite sides into the tubular columns 36 no further than the center of the tubes, so as to avoid possible interference during assembly (see horizontal hook in FIG. 3). The same hooks 29 and 29' (FIG. 3) may be purposely extended farther than the center of the tubular columns 36 and horizontally offset to a degree so that they physically contact each other. This condition strengthens the assembled bench structure. To further increase the strength of the structure, the contacting edges on the hooks 29 and 29' may be positively jointed together by means of a cement blob 37. According to one aspect of the invention, a cement consisting of an epoxy and a hardener is used. The contacting surface of one hook., e.g., hook 29, is coated with a layer of the hardener while the contacting surface of the other hook. i.e., 29', is coated with a layer of the epoxy. Such coated surfaces can be stored without change almost indefinitely, particularly if the cement components are surface sealed by very thin layers of plastics or metals. Upon assembly of the bench structure, however, these coated surfaces contact each other, the epoxy and hardener are mixed, and a strong cement joint is formed. The surface of the hooks 29 and 29' contacting the inside wall 31 and outside walls 32 of the tubular columns 36 can be similarly coated with an epoxy, while the surfaces of the walls 31 and 32 coated with the hardener, so as to achieve further strengthening of the assembled structure. Another way to achieve a permanently assembled structure is to twist or bend the hooks 29 and 29', after they are inserted through the slots 25 and 25' into the tubular columns 36. The bending or twisting can be accomplished by means of a screwdriver or a pair of pliers. A more uniform and reliable way is to insert a bending die 41 into the vertical column 36. The die 41 fits snugly inside the tube and has, on its lower end, one or more special slots 42 to engage with the hooks 29 and 29', preferably simultaneously. When the top of the bending die 41 is hit, e.g., by a hammer, the hook 29 is twisted into the required shape in accordance with the design of the slot 42 and selection of the hook material. Once bent or twisted, the hooks 29 and 29' can no longer be taken out of the thin slots 25 and 25' without the application of a great force to unbend the bent hooks. It is even possible to design an unbending die with special slots of a different shape to straighten the twisted hooks 29 or 29' for their removal from the slots 25 and 25' and for disassembly of the structure.

Figure 5A:
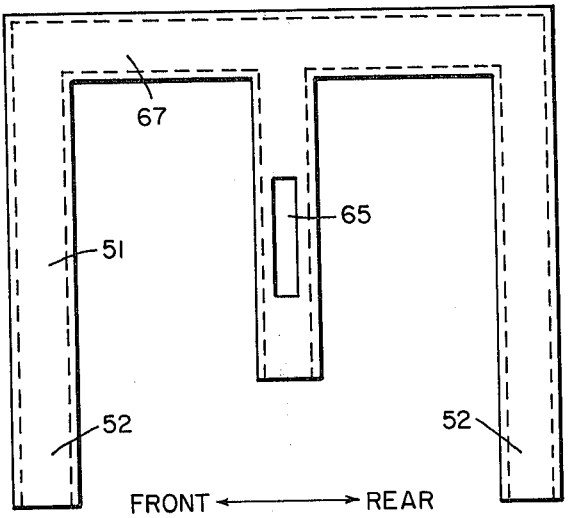
FIGS. 5 and 5A are, respectively, front and side views of a telephone booth showing the use of a gravity-locking engagement.
Figure 5:
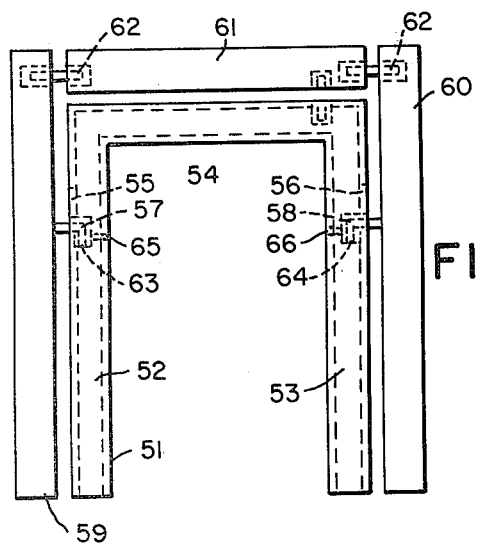

FIG. 5 shows a front view of a telephone booth comprised of two parallel, front and rear planar frames 51 made of 1½"×1½" cold-rolled steel tubes. Each frame has two vertical columns 52 and 53 joined at their tops by a horizontal member 54. The vertical columns 52 and 53 have four vertical slots 55 and 56 (two on the front frame and two on the rear frame) for engagement with four side hooks 57 and 58. These hooks are secured to the ¾" plywood, side panels 59 and 60. A horizontal top cover 61 made also of ¾" plywood is designed to rest on the horizontal members 54. The cover 61 also has four dowels 62 (two in the front and two in the rear) to engage into holes drilled into the two side panels 59 and 60. The four hooks 57 and 58 here are similar in design to those of FIGS. 1 and 2 except that the four hooks are of the gravity-locking type. That is, the weight of the side panels 59 and 60 causes the hooks 57 and 58 to engage more closely with the slots 55 and 56, while simultaneously holding the top cover 61 in its proper position with the aid of the four dowels 62.

In assembling our telephone booth, the two tubular frames 51 are first set up, one at the front and one at the rear at a specified distance apart. The top cover 61 and the two side panels 59 and 60 are guided to come together with the dowels 62 halfway in their matching holes, and positioned relative to the frames 51 so that the top member 61 is assembled at the same time as the two side panels 59 and 60 are pushed down and locked by the hooking engagements. The top cover 61 and the side panels 59 and 60, together with the tubular frames 51 and the dowels 62 and 68 are so relatively dimensioned as to have therebetween sufficient operating clearances to allow the assembly of the telephone booth in the above manner.

The top members 54 of the frames 51 should be about 7½' high and the horizontal distance between the two vertical columns 52 and 53 of the frames 51 should be about 2½', to accommodate comfortably a standing person inside the assembled telephone booth. This horizontal distance should be increased to five or six feet if the assembled structure is to be used as a voting booth instead of as a telephone booth. The top members 54 may be lowered to about 30" if the structure is to be used as a table, with the side panel 59 and 60 standing either flush with the top table member 61 or a few feet higher to provide privacy for the person using the table. Similarly, the horizontal members 22 and 22' of the bench in FIG. 1 can also be raised from 17" to about 30" to provide a single, or double table.

The new table of FIG. 1 can even be turned 90° around a vertical axis in column 36 and fitted into the structure of FIG. 5 to form a library carrel having two divided tables (i.e., the horizontal members 22 and 22'), a common book shelf (i.e., the top cover member 61), and two tall side panels 59 and 60 for privacy. Further, in this new library carrel only a single supporting device, rather than two, is needed. For example, only the two end frames 51 are needed each with two vertical columns 52 and 53. Each of these columns is provided with three vertical slots on its three sides for the hooks 29, 29', and 57 or 58. These hooks can also be inserted into the metal tubes to be bent or cemented together therein. Notice that the hooks 57 and 58 have fish-hooked tips with ⅛" lips 63 and 64 (FIGS. 3 and 5). When the side panels 59 and 60 are pushed down, these lips overjump the hooks 29 and 29', and lock them firmly in position (See FIG. 3). To release the hooks 29 and 29' from the lips 63 and 64, rods must be inserted through the holes 65 and 66 to push back the lips, and the side panels must be lifted simultaneously.

The assembly of the structures according to our invention takes two men only a few minutes. This represents savings in labor costs of over 90%. Further, in our units there are no angle irons, and no tension holding members which are weak and unreliable. Instead, most loads are now carried by the widely spread-out, bearing or compressive contact forces, either wood on wood on steel or steel. The gravity-controlled, locking engagements are particularly useful in our structures. Even the dowels do the job of both dowelling and locking.

It is easy to see that the gravity-controlled, hook-and-slot system of this invention can be used not only for such structures as chairs or benches, tables, telephone or voting booths, library carrel-table assemblies, shelves, movable furniture; but also for wall panelling, elevator interior panelling, partitions, home construction, fences, signs, and snow drift fences. In fact, the use of our novel structures is indeed very far-reaching.

Note that the booth of FIG. 5 employs two (front and rear) non-standable but rigid supporting frames 51. These two rigid supporting frames may, however, be joined together into an integral supporting device by, e.g., left and right, horizontal connecting members 67. The result is the single, self-standing device of FIG. 5A. Each of the horizontal connecting members 67 may have a vertical tubular member 68 extending therefrom to provide a single slot 65 or 66 on each side. The top member 54 need not always be horizontal, but may be inclined at 15° or 30° to the horizontal for, e.g., table applications for draftsman.

The right end of the horizontal member 61 in FIG. 5 may be swiveledly anchored to the supporting device 51, by, e.g., a vertical dowel arrangement 68. The right panel 60 with the attached hook 58 and also the right dowel arrangement 62 may then be dispensed with. But the simplified structure can also be instantly assembled and disassembled, in quite a similar manner as the complete structure of FIG. 5. Such a simplified structure may be used, for example, as a table or department store shelf. The right panel 60 can also be considered or even made as part of the right column 32 of supporting device 51, with the horizontal dowel arrangement 62 provided thereon for pivotally anchoring the top member 61 thereto.

The rigid, supporting device 21 of FIG. 1 may or may not be self-standing. If not self-standing, the device 21 may comprise two (front and rear), three (front, intermediate, and rear), or more frames 21 of identical designs.

FIG. 2A shows some details of the hook 29 formed by, e.g., cutting the outline of the hook without detaching at position 30 from a (16 gauge) metal plate 27, and horizontally bending the cut-out portion, from a central or non-edge portion of the plate, 90° along a line 34 at the bottom 30 into the position shown. The thickness of the cut-out portion then forms the inner locking and outer locking edges of one side of the open end of the hook, with the remaining, uncut metal plate forming the other side of the open end. This open end has a width w from $\frac{3}{8}''$ up as shown in FIGS. 2 and 2A. The hook 29 also has a thickness $t_h$ which can be uniform or, for easy insertion into the slot 25, tapered from the front entrance edge 33 on the right to a thicker portion at the rear or bottom area 30. The thickness $t_h$ at the top edge and entrance edge 33 must be smaller than the slot width $t_s$, while $t_h$ at the bottom of the hook 29 may be even larger than $t_s$, to achieve interference fits as described previously. For uniform $t_h$, the difference $t_s - t_h$ generally varies from 0.002–0.015" (preferably 0.005") for tight fits, and up to 0.015–0.035" (preferably 0.020") for loose fits. The width t of the open end of the hook 29 should be from −0.005" less (interference fits), through +0.003" (tight fits), to +0.020" (loose fits) more the thickness of the (sheet) metal plate 36. A rounded hook corner with radius r=0.010–0.025" is provided to facilitate the engagement of the hook 29 with the slot 25. The height of the hook 29 (for a typical case to carry 25 pounds) is about $1\frac{3}{4}''$. The top portion y of the hook 29 contacting the tubular frame wall 36 varies from $\frac{1}{4}''$ up, preferably over $\frac{3}{8}''$. The front surface of the $\frac{3}{4}''$ plywood, vertical member 26 may be countersunk so that it is substantially flush (or coplanar) with the front surface of metal plate 27. This arrangement allows the rear surface of the tubular metal wall 36 to bear directly against the same front surface thereby further strengthening the locking engagement.

Figure 6:
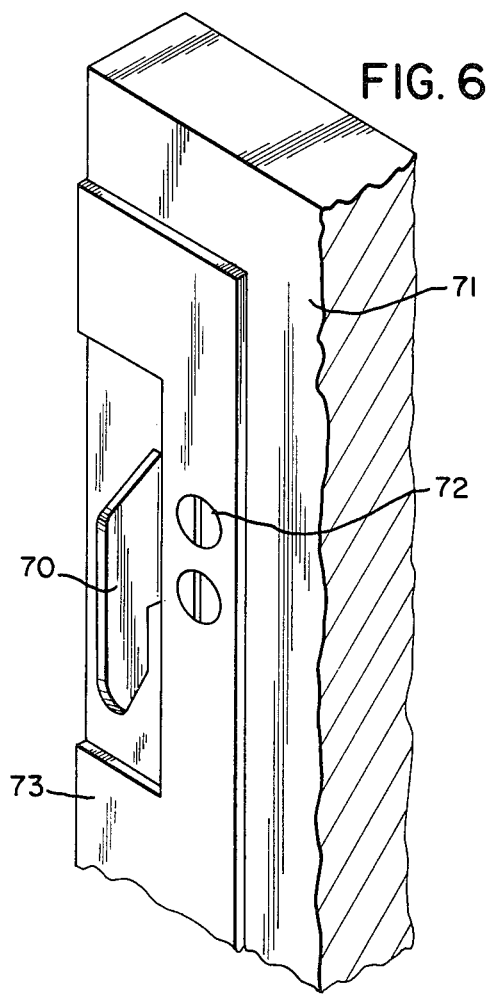
FIG. 6 shows a hooking device applied to an interior or exterior panel of a house according to the invention.

The easy-to-assemble house is described in conjunction with FIGS. 6–11, as follows: FIG. 6: shows the hooking device 70 as applied to an interior or exterior panel 71, which may consist of wood, concrete or sheet metal. FIG. 6 also shows two screws used as the fastening devices 72 for the hooking device.

FIG. 6 shows the metal hook plate 73 from which the hook 70 is made. These fastening devices 72 are preferably wood screws for $\frac{3}{4}''$ panels, self-tapping screws or weldments for $\frac{1}{4}''$ to $\frac{3}{4}''$ steel panels, and embedded fasteners for 1" to 2" concrete panels.

Figure 7:
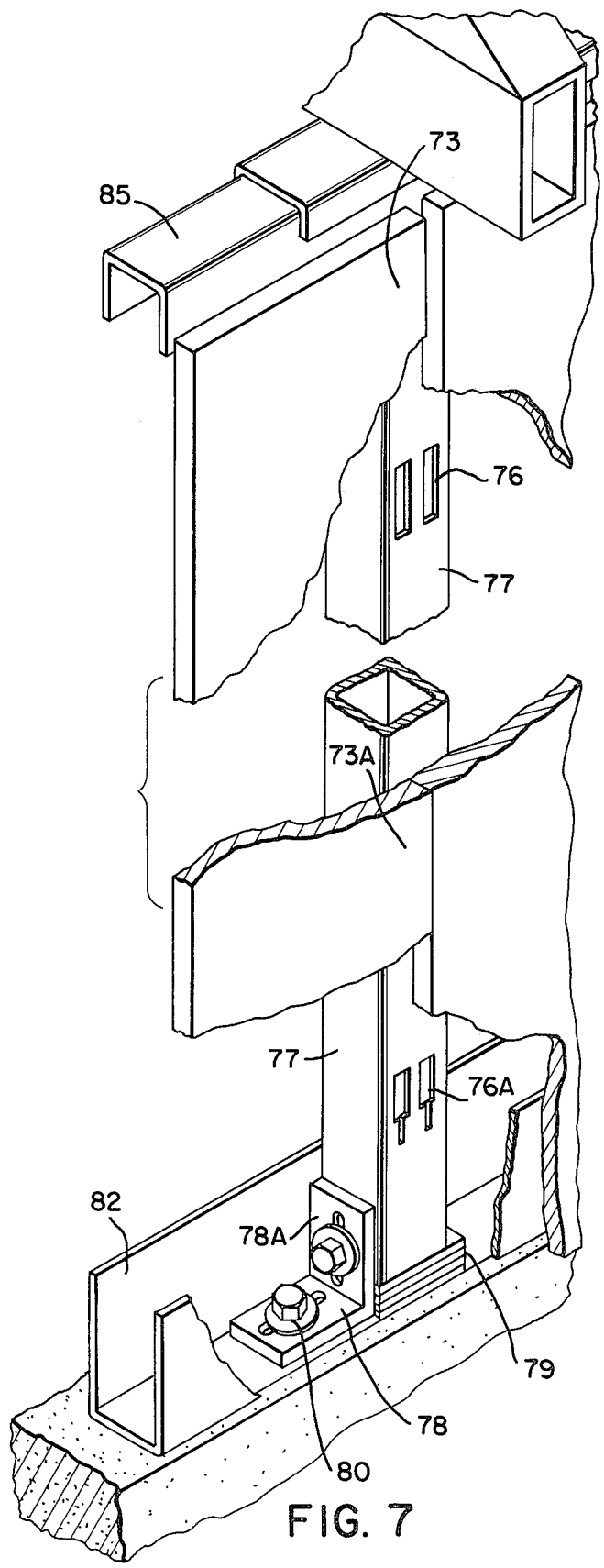
FIG. 7 shows a partial view of the inside and outside construction of an improved house.

FIG. 7: shows a partial view of the inside and outside construction of the house. Here, the wall-post 77 is a square steel tube varying in size (from $1\frac{1}{2}''$ to 4") and gauge (24 gauge to $\frac{1}{4}''$) according to the specified payload. The post has upper slots 76 with varying widths (3/32" to $\frac{1}{4}''$) and lengths (1" to 6") to accept the hook 70 of FIG. 6. This hook also will vary in widths (3/32" to $\frac{1}{4}''$) and lengths ($\frac{7}{8}''$ to $5\frac{1}{2}''$) according to payload specifications. FIG. 7 also shows lower slots 76 A having the same dimensions as the upper slots 76, but with lower portion tapered and narrowed down from 3/16" to 1/16" wide into straight narrowed slots 16" wide for the purpose of friction fit of the inserted hook 70 of FIG. 6. The narrower slots prevent the hooks 70 from moving sidewise when used with a reveal, as illustrated in FIG. 7. Also provided are angle irons 78, each with two slots 78A (1–2" wide) to facilitate adjustments of height with shims 79, and for the easy adjustment of the post 77 in either direction. Set bolts 80 are used here to secure post when in the final position. Up to the time of fastening, the post 77 is actually a floating post, i.e., it can move sideways (see arrow). A structural base channel 82 is bolted through the slots 78A in the angle iron 78 to the foundation.

Figure 9:
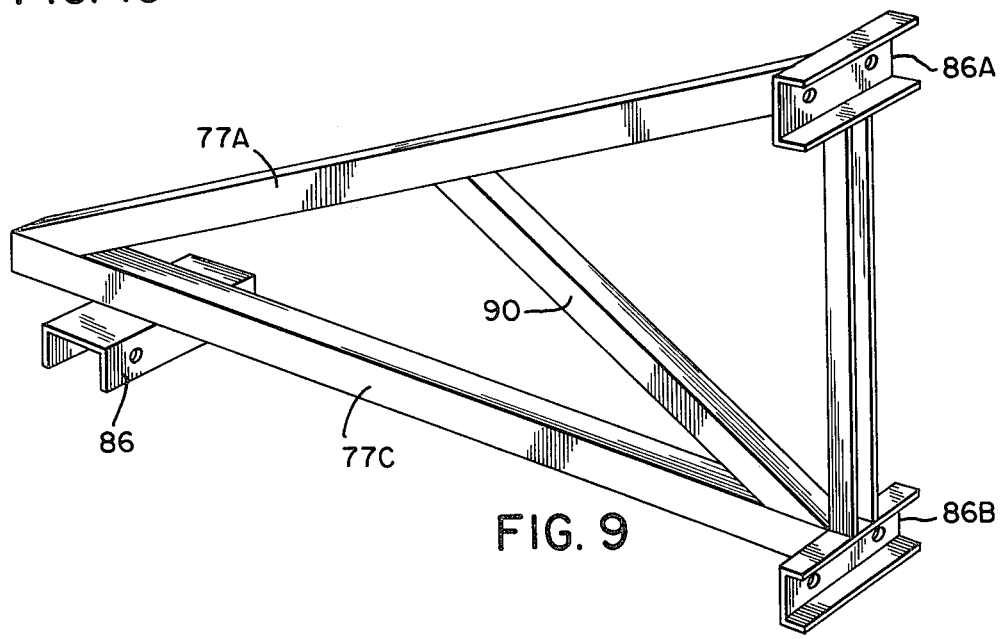
FIG. 9 shows a roof structure of a house according to the invention.

The hat channel 85 in FIG. 7 is a structural member to carry the roof structure 90 illustrated in FIG. 9, and to hold posts 77 in position. The roof structure 90 illustrated in FIG. 9 is then bolted to the hat channel 85 through the welded-on channel 86. Channels 86A and 86B (see FIG. 9) are then bolted through the upper and lower structural carrying members 77A (see FIG. 9) and 89, (See FIG. 8 and FIG. 9) respectively. It is a post which is similar to post 77 and which will accept the roof pans in the same manner as the post 77 in FIG. 7. In the installation of the wall and roof panels 71, the upper hook 70 is longer than the lower hooks 70A to enable the erection crew to engage the lower hooks 70A into the slots without having the upper hooks 70 being pulled out. The hook plate 73 is a continuous strip of metal with variably spaced (from approx. 6" to 4 ft.) hooks 70 and 70A etc. formed thereon as per structural specifications. The roof structure in FIG. 9 has no carrier walls to interfere with our new system as shown in FIG. 7, but with the same system for interior movable walls—this will include only hat channel 85, post 76, floor channel 82 and shims 79—the guage of the interior walls will vary. Hat channel 85 can be fastened to structural member 77C in FIG. 9.

Figure 11:
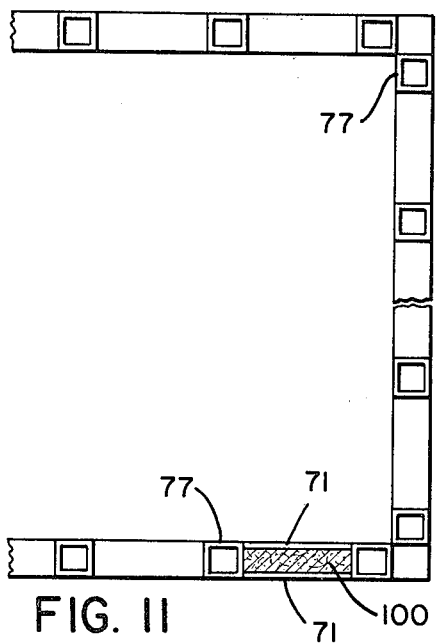
FIG. 11 shows a top view of the house of the invention.
Figure 10:
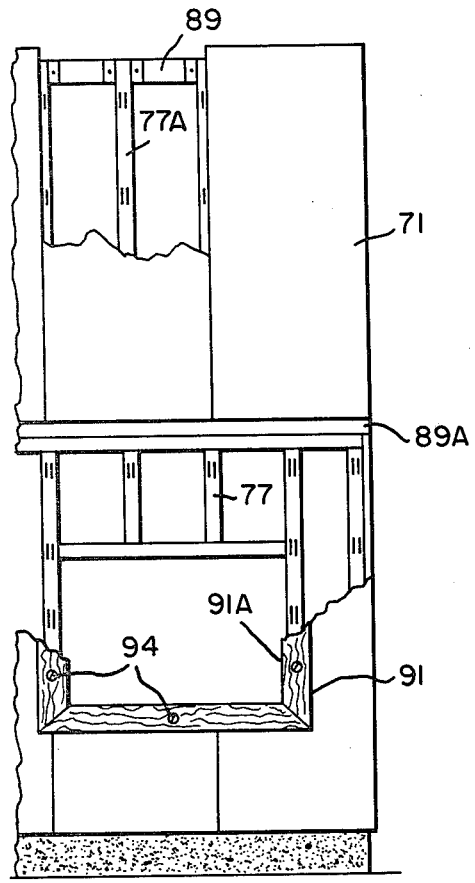
FIG. 10 shows a window or door for an improved house.
Figure 8:
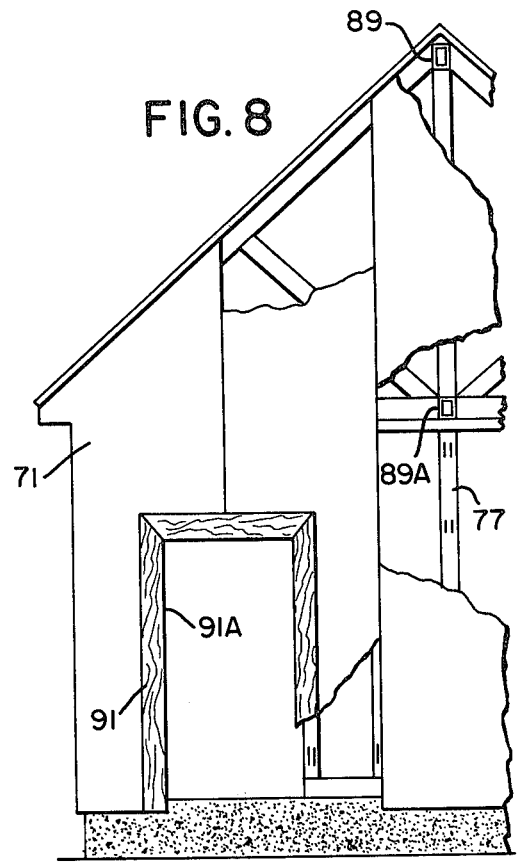
FIG. 8 shows a side view of the house of the invention.

FIG. 10 illustrates a window (or door) which is made of an outer frame 91 and an inner frame 91A. This constructure permits easy assembly of window (or doors) by just pushing the outer frame 91 into inner frame 91A, or vice versa. The two frames 91 and 91A are then held together by four screws 94 which engage both frames and hold the window (or door) in position. The glass tracks will be of a standard type material, installed into the window. These materials are now available on the market. FIG. 11 shows a top view of the house with the many posts 77, panels 71, and insulation panels 100.

The new and improved hook system of FIG. 6 differs from the previously-described hook system (FIG. 5) in several important respects:

First: The new hook system has an integral hooking device 70 provided with a number of hooks equally spaced apart for better application onto the panels. It is manufactured in one length, preferably of the same length as the panel or slightly shorter (leaving 1–5" at each end). This hooking device could be manufactured in a continuous forming roll for adapting to any size panel.

Second: The purpose for this full length hooking device 70 is for easier application, in contrast to applying individual, spaced hooks which we originally disclosed in U.S. Pat. Nos. 3,845,988 and 4,045,090. We have found that the individual hooking devices cannot easily be applied accurately to line up with slots in square tubing.

Third: Not only has the length of the hooking device been revised but also the upper hook 70 itself has been lengthened. This lengthening of the upper hook 70 has been designed so that panels when being applied as walls in the housing industry will enable the erection crew to have better control in applying the panel 71 to the post 77. Through our experience and experimenting with our previous hooking devices, we found that there is a certain amount of warpage in all panels. In order to overcome this warpage, we found it desirable to lengthen the upper hook 70. By making the upper hook longer, the erection crew is able to engage the lower hooks 70A into the slots without having the upper hooks 70 being pulled out. When this is completed, one can then lock the panel 71 into position by pulling down the panel.

Fourth: This new hooking device 73 can be made for either friction or non-friction fit. By "friction-fit" we mean the sides of the hook 70 are contacting the edges of the slots 76. By "non-friction fit," we mean the hook 70 is loose in the slot 76. Also it can be applied as a gravity or non-gravity structure depending on whether gravity acts on the locking engagement. With the anti-gravity fit, gravity on the members looses the locking engagement, the base would be inserted between the floor or foundation to prevent the panel from moving to loosen the engagement. For sidewise friction, the slots 76 in the post 77 can be formed so that the hooks 70 can become a friction or floating (i.e., non-friction) type application.

Fifth: Dimensions of the new hook system are as follows:
(1) Thickness is 18 gauge but may vary from 24 guage up to ¼ inch or more.
(2) The width of metal strip of the hook plate 73 for fabrication is approximately 1½ inch before fabrication. This width can also vary up to 4 inches for the thicker materials.
(3) The length of each hook 70 is 1½ inches with the exception of the top hook which is 1¾ to 2 inches long (this is a most important point).
(4) The posts 77 can be fabricated in such a way as to give additional area for hanging other items (such as shelves or cabinets) with the same hook-and-slot system but with the addition of extra slots between the panel slots.

Sixth: The hook is made from a cut-out edge portion of a metal plate so that the thickness of this edge portion forms the inner and outer edges of one side of the open end of the hook, the outer edge generally coinciding with a selected original edge of the metal plate.

Description of our revised hook as it is applied for housing, paneling and like structures is given below: The housing structure is constructed of structural tubing and structural upper and lower channels. The post is on a floating system held in position by standard size panels. In the process of manufacturing, the upper and lower channels are marked to correspond with a mark on the center of the post when the panel is engaged. This makes the process of erection much faster than the conventional type which involves screwing the part to base. Since we are involved in typical house lengths of 40 or 50 feet, it is impossible to have the pilot holes prebored. To avoid costly working with close tolerances, we have decided on a floating system, in which the posts can readily move sidewise to accommodate, rather than a stationary system, to avoid any delays and complications in the erection. The posts, panels (walls) are held in position by a specially-designed channel and cross members. The hooking device when engaged in the post, whether floating or friction fit, acts as a stabilizer in preventing any sidewise motion. The whole structure is held in position by a structural hat channel, tied in all four corners, roof and cross members.

For the inner paneling of interior walls, the same system is used except that structural guage materials are used for the posts and channels. This is not necessary because of the weight factor. The roof system is applied in the same manner as the wall system (slotted posts and hooks applied to pans of approximately 24 inches in width and they are full length of roof). With a metal pan type of system, the hooks and pan are manufactured as a whole. In the manufacturing process the hooks and then the pan are punched in dies on a cold roll and are shaped to any size or shape to accept insulating materials or fire-rated materials. These pan type panels are excellent for use in schools, hospitals or wherever fire-rated panels are needed. This type of pan construction should hold the fire retardant material without any adhesives, which have a tendency to decompose under heat. With our type of system, the cost is greatly reduced, but the effectiveness of the panel is consistently high. Our revised hooking device can be applied to wood by means of screws or adhesives, embedded into concrete (panels) or plastic materials; or welded to metals.

Readily incorporated into these houses are the usual electrical wires, water pipes, telephone and television lines, intercom, vacuum systems, gas lines, and any other type of utility lines available today. This type of construction allows the user many ways and means of access without disturbing walls or having costly expenses.

Advantages of our new housing system are:
(1) The house is strong, durable, easily assembled, and very low in cost.
(2) Easy removal of wall panels for working on electrical wiring and pipes, or for cutting in new outlets or switches.
(3) Simple interchanging of panels from one room to another for color schemes—because of the uniform width and height, all rooms can be changed for different color schemes in contrast to conventional repainting or repaneling. All changes can be made by two persons in one evening with our simple but unique hook-and-slot locking systems.
(4) Extra rooms can be provided by simply adding on a foundation, placing channels on foundation, then adding the sidewalls but reusing the existing cross wall and roof. This can all be accomplished without destroying any of the existing materials on hand. This operation could be accomplished without disrupting the household and, most of all, at a very reasonable cost.
(5) Our system allows, with only a minor adjustment, for placing (kitchen) cabinets and shelving on a hook-up basis for easy removal or installation.
(6) Our new system is suitable for office building enclosures for both interior and exterior uses and for library construction.
(7) Our method of hooking can also be applied to make sections for the roof provided with certain alterations, such as to care for the elements.
(8) Windows and doors can be manufactured in two inner and outer sections for installing in a sliding movement.
(9) All the electrical wirings are preferably engineered with coupling devices for easy installation so as not to interfere with or hold up the quick installation of the entire building. Heating and plumbing lines can be similarly engineered.
(10) Solar panels can be easily adapted to this method of hooking construction for conservation of heating fuels and electricity.

The invention is not to be construed as limited to the particular forms disclosed herein, since these are to be regarded as illustrative rather then restrictive.

We claim:
1. An assembled structure comprising:

a supporting device containing therein wall means which defines an elongated slot and having also a first supporting surface and a second supporting surface in an angular relation with the first supporting surface;

a first structural member having a first contact surface engageable with the first supporting surface;

a second structural member having a second contact surface engageable with the second supporting surface so as to be adjacent to, and disposed in approximately the angular relation with, the first member; and a hook on the first member and configured for insertion into the slot upon alignment with and for sliding along, the slot, said slot having at its top a hook insertion portion narrowing down into a substantially narrower but parallel-sided, hook locking portion which has a substantially continuous and vertically elongated contact length, said hook securing the first member in gravity-controlled, locking engagement with the slot on the supporting device;

the location of the second member in its intended position on the assembled structure preventing the disruption of the locking engagement of the first member with the slot on the supporting device;

the first and second structural members, together with the supporting device being so relatively dimensioned and positioned as to have therebetween operating clearances so substantial that upon locating the second member in the intended position on the assembled structure and simultaneously upon aligning the hook with the slot, the hook is insertible into the slot and subsequently slidable therealong whereby the second contact surface on the second member is made to engage with the second supporting surface at substantially the same time the first contact surface on the first member is made to engage with the first supporting surface so that the locking engagement is achieved and the assembly of the structure is substantially instantly completed.

2. The structure as in claim 1 wherein said contact length is at least $\frac{3}{8}"$ long.

3. The structure as in claim 2 including an added number of hooks of generally the same design and formed in the same manner as the hook, and an equally added number of matching slots on the supporting device, all slots and hooks being generally vertically oriented, the topmost hook being at least $\frac{1}{4}"$ longer than the other hooks so as to facilitate engagement of the lower hooks into their respective slots without having the topmost hook being pulled out of its matching slot.

4. The structure as in claim 3 wherein said topmost hook is over $\frac{1}{2}"$ longer than the other hooks.

5. The structure as in claim 2 wherein the locking engagement is of the gravity-locking type, the weight of the first member tending to strengthen the locking engagement.

6. The structure as in claim 3 wherein the supporting device comprises a support member having therein a plate material portion which has two major surfaces, the slot extending in and across the plate material portion to terminate at the two major surfaces thereof, and the hook comprises a plate secured to the first member and has two major surfaces thereon, an edge portion of the plate being cut out in the outline of an open-ended hook and bent up about 90° along a line still attached to the plate to form the hook so that the thickness of the cut-out and bent-up portion forms the outer and inner edges of one side of the open end of the hook, the remaining, uncut plate forming the other side of the open end of the hook.

7. The structure as in claim 6 wherein the outer edge of the hook exactly coincides with a selected outer edge of said edge portion of the plate.

8. The structure as in claim 6 wherein the thickness of the open end of the hook is less than the width of the slot by a difference of less than 15 mils.

9. An open-ended hook system comprising a specified number of hooks for locking engagement thereof with a structure member having thereon an elongated slot system comprising an equal number of substantially parallel slots through which the multiple hooks can be inserted, in an individually matching manner, and along which the hook system can be moved after the insertion to thereby lockingly engage the hook system with the member, each slot having at its top a hook insertion portion narrowing down and terminating into a substantially narrower but parallel-sided, hook-locking portion having an internal hook bearing surface and an external hook bearing surface, said two bearing surfaces being generally continuous and vertically elongated, each of the multiple hooks being insertible into the hook insertion portion of the respective slot and the open end of the hook being subsequently slidable along at least one of the internal and external bearing surfaces on the member, comprising:

a plate having an edge portion thereof partially cut out in the outline of the open ends of all the multiple hooks, said cut-out edge portion being bent up from the plate about 90° along a line still attached to the plate to form the multiple hooks so that the thickness of the cut-out edge portion forms the inner and outer edges of the one side of the open ends of all the multiple hooks, with said outer edges coinciding with a selected outer edge of said edge portion, the remaining, uncut plate forming the other side of all the open ends of the multiple hooks, all the slots and hooks being generally vertically oriented with the topmost hook being at least $\frac{1}{2}"$ longer than the other hooks so as to facilitate the engagement of the lower hooks into their respective slots without having the topmost hook being pulled out of its matching slot.

10. The hook system as in claim 9 wherein the thickness of the plate is less than the width of the slots by a difference of less than 15 mils.

* * * * *